United States Patent Office 3,702,362
Patented Nov. 7, 1972

3,702,362
USE OF UREIDO DIPHENYL SULFONES IN THE TREATMENT OF MAREK'S DISEASE
Tsung-Ying Shen, Westfield, David B. R. Johnston, Warren, and Theodore A. Maag, New Shrewsbury, N.J., assignors to Merck & Co., Inc., Rahway, N.J.
No Drawing. Filed Sept. 17, 1970, Ser. No. 73,246
Int. Cl. A61k 27/00
U.S. Cl. 424—322
14 Claims

ABSTRACT OF THE DISCLOSURE

Certain diphenyl sulfones having 4,4'-substituents, the substituents being independently nitro, amino, acetamido, formamido, loweralkoxycarbonyl, or ureido, can be used to reduce mortality and decrease lesion incidence of poultry exposed to Marek's disease. The use of these compounds and compositions comprising the compounds as active ingredients are provided.

DESCRIPTION OF THE PRIOR ART

The compounds useful in the process of this invention are known; see Northey, The Sulfonamides and Allied Compounds, Reinhold, 1948. See also U.S. Pat. No. 2,328,548 for sulfones active against cocci-caused infections.

SUMMARY OF THE INVENTION

The use of certain diphenyl sulfones is provided for the treatment and prophylaxis of Marek's disease, to prevent poultry death and sickness as well as to decrease the incidence of lymphoproliferative foci and associated inflammatory-like lesions. The sulfones also serve as growth promotants by decreasing subclinical disease. Poultry feed compositions are provided which contain the sulfones in low concentrations, but which are active against the disease. In addition, soluble salts of the sulfones are provided which can be dissolved in the drinking water for ease of treatment of the poultry. Molecular complexes of the compounds can also be employed to enhance solubility and distribution in the feed. Feed supplement pre-mixes can also be provided containing the active compounds.

Marek's disease is a highly infectious lymphoproliferative disorder of poultry, especially chickens. Marek's disease has also been known as neural leukosis. The causative agent(s) are viral with a DNA-type virus implicated as an etiological factor. Marek's disease often is clinically evident in birds prior to sexual maturity, i.e., before the first egg is laid. Clinical manifestations may be one or more of these signs: regional or generalized paralysis, diarrhea with fecal staining of posterior abdominal feathers, weight loss, dyspnea, blindness, enlarged abdomen, or death.

The lesions evident are one or more of the following: lymphocytic infiltrated peripheral nerves and/or feather follicles; lymphoproliferative lesions, microscopic to several mm. in size, within any tissue of the body but principally within the liver, spleen, kidney, gonads, heart, proventriculus, breast muscle, skin, and nerves.

Marek's disease is estimated by the U.S. Department of Agriculture to cause a $200 million annual loss to the U.S. poultry industry. This loss is due to mortality and morbidity and to the rejection of slaughtered bird carcasses as being unfit for human consumption. This rejection is due to the presence of the lymphoproliferative foci.

The compounds which, according to this invention, have been found to be active against Marek's disease are sulfones having the following formula:

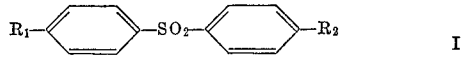

in which $R_1$ is loweralkanoylamino, loweralkoxycarbonylamino, loweralkyl, or nitro; and $R_2$ is loweralkanoylamino, loweralkoxycarbamoyl, nitro, or ureido. Preferably, $R_2$ is ureido. $R_1$ and $R_2$ are chosen independently from each group. By the term "loweralkanoyl or loweralkoxy" is meant a group containing 1–6 carbon atoms. $R_1$ and $R_2$ can also be the same and can both be amino; additionally, $R_1$ can be loweralkanoylamino and $R_2$ can be amino.

Within the ambit of the above Formula I, the following compounds are particularly useful in the treatment and control of Marek's disease:

4-acetamido-4'-ureido-diphenyl sulfone;
4-formamido-4'-ureido-diphenyl sulfone;
4-ethoxycarbamoyl-4'-ureido-diphenyl sulfone;
4-nitro-4'-ureido-diphenyl sulfone;
4-acetamido-4'-nitro-diphenyl sulfone;
4,4'-diacetamido-diphenyl sulfone;
4-acetamido-4'-amino-diphenyl sulfone; and
4,4'-diamino-diphenyl sulfone.

The corresponding thio (—S—) and sulfinyl (—SO—) derivatives of these compounds of Formula I can also be used against Marek's disease. For instance, the compound 4-(4'-ureido-phenylthio)-nitrobenzene:

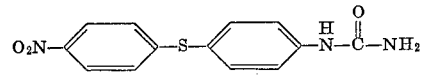

shows good activity.

Of the compounds listed above, the following compounds are most useful:

4-acetamido-4'-ureido-diphenyl sulfone;
4-ethoxycarbonyl-4'-ureido-diphenyl sulfone;
4-nitro-4'-ureido-diphenyl sulfone;
4,4'-diamino-diphenyl sulfone; and
4-(4'-ureidophenylthio)-nitrobenzene.

In addition to the above groups, other compounds of the diphenyl sulfone series have been found which have activity against Marek's disease. These compounds can be described as having the following formula:

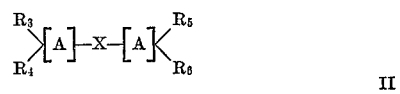

in which X is —$SO_2$—, —S—, or —SO—, [A] is phenyl or heterocyclic aryl, and $R_3$ and $R_5$ are substituents on the [A] ring, each independently selected from the group consisting of amino, alkylamino, dialkylamino, benzoylamino, substituted benzoylamino, guanidino, alkoxy, halo, haloalkyl, alkylthio, thiol, ureido,

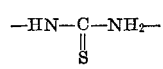

heteroaryl or alkylthiocarbamoyl; and $R_4$ and $R_6$ are each independently hydrogen, amino, alkylamino, dialkylamino, benzoylamino, substituted benzoylamino, guanidino, alkoxy, halo, haloalkyl, alkylthio, thiol,

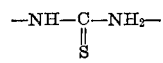

heteroaryl, or alkylthiocarbamoyl. The groups $R_3$, $R_4$, $R_5$ and $R_6$ can be located in any position on the respective rings. Any of the R groups above can also be substituted amino, the amino being substituted with aryl, alkyl, heteroaryl, or substituted aryl, alkyl or heteroaryl.

The terms "alkyl" or "alkoxy" when used in the definitions of $R_3$, $R_4$, $R_5$ or $R_6$ are employed to mean an alkyl group of 1–8 carbon atoms, and preferably to mean a loweralkyl or loweralkoxy group of 1–6 carbon atoms.

The above compounds are all known and described in the literature. Preferred compounds within the ambit of Structure II include those in which A is phenyl and $R_4$ and $R_6$ are hydrogen, and $R_3$ is benzoylamino or substituted benzoylamino, and $R_5$ is ureido. By the term "substituted benzoylamino" is meant a benzoylamino group having one or more substituents chosen from the group consisting of —COOH—, —OH—, or loweralkyl. Preferably, a substituted benzoylamino having a carboxyl substituent is employed. The preferable compound is therefore 4-(2'-carboxybenzoylamino)-4'-ureido-diphenyl sulfone.

Another class of preferred compounds are those in which A is phenyl, and $R_4$ and $R_6$ are hydrogen, and $R_3$ and $R_5$ are alkylamino, preferably the same and preferably methylamino. Another class of compounds are those in which $R_3$ is amino and $R_5$ is alkylamino, for instance, methylamino, ethylamino, or n-propylamino. Soluble salts of all these compounds, such as the sodium salts or the quaternary ammonium salts can also be prepared. Molecular complexes of the sulfones with organic and inorganic complexing agents can also be used in the treatment of the disease. Preferably, the compounds are employed in the free base form, although the salt or complex form can be used if desired.

The compounds of this invention may be tested for efficacy against Marek's disease in the following manner: Chickens are infected with virus-containing lymphoblasts originally obtained from a chicken with a typical case of Marek's disease. The medication can be orally or subcutaneously administered daily, either in the diet or by parenteral infection as an aqueous suspension. After an appropriate experimental period, wherein over 50% of the non-medicated controls succumb, all surviving birds are sacrificed. All dead and sacrificed birds are autopsied and lesion incidence recorded.

In accordance with this invention, named sulfones are employed for controlling Marek's disease by oral administration to poultry susceptible to the disease, either in the drinking water or feed. The chosen sulfones can also be administered by parenteral injection.

The preferred mode of administration of the chosen sulfone is by dispersion in the finished feed of the animals. The medicated feed is then fed ad libitum to the birds. Good results against Marek's disease are achieved with feedstuff containing from about 0.0005% to 0.5% by weight of the sulfone. The preferred range is between 0.001% to 0.1% in the feed and the optional range is 0.01% to 0.1%. Levels in poultry feed are here expressed in terms of percent by weight of concentration.

The higher levels may be used in treating an established outbreak of Marek's disease, but the higher dosages are not preferred for prophylactic treatment where medicated feed is given continuously to the poultry. It will be appreciated by those skilled in this art that the lowest levels consonant with adequate control of Marek's disease will be used in most instances in order to eliminate as far as possible any side effects that might be induced on prolonged feeding of unnecessarily high levels. The finished feed in which the above-described levels of the sulfone are employed is a nutritionally adequate one containing sources of carbohydrate, protein, fat, vitamins, minerals, and other nutritional factors commonly employed in commercial poultry raising. In addition, other poultry feed additives such as coccidiostats, e.g., Amprolium, ethopabate, nicarbazin, can be employed in the compositions. The feeds can also contain additives which potentiate the action of the sulfones so that lower levels can be used in the feed.

In addition to administration via the solid feedstuff, the compounds of the invention may be administered to poultry by incorporation in the drinking water. The preferred dose levels in the drinking water are usually somewhat less than those employed in a solid feed inasmuch as poultry drink about twice as much as they eat. The operable level in drinking water is from 0.00001% to 0.2% by weight and the preferred range is 0.0002% to 0.1% by weight. Administration via the drinking water is of advantage when using the compound therapeutically rather than prophylactically. For this purpose it is convenient to prepare dispersible or water-soluble powders in which the sulfone is intimately dispersed in a suitable water-soluble or dispersible liquid or solid carrier such as dextrose, sucrose, DMSO, or other suitable non-toxic carriers, at concentrations of from about 0.03% to about 25% by weight. These solids may then be conveniently added to the drinking water by the poultry grower.

A typical drinking water formulation contains 4-acetamido - 4' - ureido - diphenyl sulfone, 0.3%; 1-(2-n-propyl - 4 - amino - 5 - pyrimidinylmethyl) - 2 - methyl pyridinium chloride hydrochloride, 9.6%; dextrose, 30%; propylene glycol, 20%; dimethylpolysiloxane, 0.002%; polyoxethylene sorbitan monoleate, 0.2%; water, to 100%.

The compounds of this invention can also be administered parenterally. A sterile pharmaceutical carrier can be employed. Alternatively, an aqueous suspension or solution of the free-base form of the sulfone, or an aqueous solution of a soluble salt of the sulfone can be used. The concentration of compound in the injection is adjusted to give the desired amount of compound per kilogram of body weight daily. Generally, 1–200 mg./kg. are operable, and 10–50 mg./kg. are preferred. The compound can also be encapsulated subcutaneously to give a sustained release of the drug over a pre-determined amount of time. The amount of compound in the implanted capsule can be adjusted according to rate of dispersion over the time period until the next implantation.

According to a further aspect of this invention, there are provided compositions comprising poultry feed supplements or additives containing the sulfones previously described as an effective Marek's disease agent. In such compositions, the compound is mixed with or dispersed in an orally ingestible carrier vehicle that is non-toxic to the poultry and compatible with the finished feedstuff. These feed supplements contain a significantly higher percentage of the sulfone than does the finished feed, and are mixed with or blended into the feedstuff before administration to the poultry. In order to assure uniform distribution of the compound in the finished feed, it is customary to employ an intermediate dilution step in which the supplement is blended with a portion of the final feed, and this "intermediate mix" is then added to the remainder of the feed with adequate mixing. The sulfones described hereinabove may be formulated into feed supplement compositions containing from about 0.05% to about 50% by weight of drug. It is preferred in the industry to use from about 1–5 pounds of such a supplement per ton of feedstuff. It will, therefore, be appreciated that the preferred supplement concentration will depend to a large extent on the final use level desired. With the compounds of this invention, feed supplement compositions containing from about 1.0% to about 40% by weight of active ingredient are preferred.

Diluent or carrier vehicles that may be used in these poultry feed supplements are solid orally ingestible poultry feed additives such as corn meal, distillers' dried grains, ground oyster shell, citrus meal fermentation residues, wheat shorts, wheat middlings, molasses solubles, corn gluten feed, soybean meal, dehulled soya flour, crushed limestone, fermentation mycelia, edible vegetable substances and the like. Nutritive carriers are preferred since the finished feed is benefitted thereby.

Examples of typical feed supplements containing the compounds of the present invention are:

(A)

| | Lbs. |
|---|---|
| 4-ethoxycarbamoyl-4'-ureido-diphenyl sulfone | 1.5 |
| Amprolium | 25.0 |
| Wheat middlings | 73.5 |

(B)

| | Lbs. |
|---|---|
| 4-formamido-4'-ureido-diphenyl sulfone | 5.0 |
| Corn gluten feed | 95.0 |

(C)

| | Lbs. |
|---|---|
| 4-(2'-carboxybenzoylamino)-4'-ureido-diphenyl sulfone | 2.0 |
| Corn germ meal | 40.0 |
| Corn distillers' grains | 58.0 |

(D)

| | Lbs. |
|---|---|
| 4,4'-diamino-diphenyl sulfone | 1.0 |
| Corn distillers' dried grains | 99.0 |

(E)

| | Lbs. |
|---|---|
| 4-(4'-ureidophenylthio)-nitrobenzene | 0.5 |
| p,p'-Bis-ureido-diphenyl sulfone | 2.0 |
| Distillers' dried grains | 97.5 |

What is claimed is:

1. A method for combatting Marek's disease in poultry which comprises administering to poultry an effective amount of a compound of the following formula:

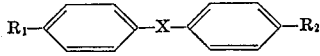

in which X is —SO$_2$—, —SO—, or —S—; R$_1$ is loweralkanoylamino, loweralkoxycarbonylamino, loweralkyl, or nitro; and R$_2$ is ureido.

2. The method of claim 1 in which X is —SO$_2$—.
3. The method of claim 2 in which the compound is 4-acetamido-4'-ureido-diphenyl sulfone.
4. The method of claim 2 in which the compound is 4-nitro-4'-ureido-diphenyl sulfone.
5. The method of claim 2 in which the compound is 4-formamido-4'-ureido-diphenyl sulfone.
6. The method of claim 2 in which the effective amount of the diphenyl sulfone is administered orally.
7. The method of claim 6 in which the effective amount administered orally is 0.0005% to 0.5% by weight of the poultry feedstuff.
8. A method for combatting Marek's disease in poultry which comprises administering to poultry an effective amount of 4-(4'-ureidophenylthio)-nitrobenezne.
9. The method of claim 8 in which the effective amount of the diphenyl sulfone is administered orally.
10. The method of claim 9 in which the effective amount administered orally is 0.0005% to 0.5% by weight of the poultry feedstuff.
11. A method for combatting Marek's disease in poultry which comprises administering to poultry an effective amount of 4-(2'-carboxybenzoylamino)-4'-ureidodiphenyl sulfone.
12. The method of claim 11 in which the effective amount of the diphenyl sulfone is administered orally.
13. The method of claim 12 in which the effective amount administered orally is 0.0005% to 0.5% by weight of the poultry feedstuff.
14. A composition which comprises a poultry feedstuff having admixed therein 0.0005% to 0.5%, based on the weight of the feedstuff, of a compound of the following formula:

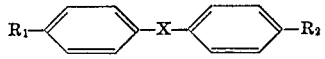

in which X is —SO$_2$—, —SO—, or —S—; R$_1$ is loweralkanoylamino, loweralkoxycarbonylamino, loweralkyl, or nitro; and R$_2$ is ureido; or a compound selected from the group consisting of 4-(4'-ureidophenylthio)-nitrobenzene, and 4-(2'-carboxybenzoylamino)-4'-ureidodiphenyl sulfone.

References Cited

UNITED STATES PATENTS

| 2,328,548 | 9/1943 | Dohrn et al. | |
| 3,060,235 | 10/1962 | Martin et al. | 424—322 |

SAM ROSEN, Primary Examiner